United States Patent [19]

Horn et al.

[11] 4,102,871

[45] Jul. 25, 1978

[54] COPOLYAMIDES FROM LACTAM AND DIAMINE SALTS OF TWO DIFFERENT DICARBOXYLIC ACIDS

[75] Inventors: Peter Horn, Ludwigshafen; Hanns-Dietmar Haertl, Bruehl; Karl Heinz Illers, Otterstadt, all of Fed. Rep. of Germany

[73] Assignee: BASF Aktiengesellschaft, Ludwigshafen, Fed. Rep. of Germany

[21] Appl. No.: 658,527

[22] Filed: Feb. 17, 1976

[30] Foreign Application Priority Data

Mar. 6, 1975 [DE] Fed. Rep. of Germany ....... 2509791

[51] Int. Cl.² .............................................. C08G 69/14
[52] U.S. Cl. ................................. 528/324; 260/18 N; 428/474; 528/327; 528/329
[58] Field of Search ............... 260/78 L, 78 A, 78 TF

[56] References Cited

U.S. PATENT DOCUMENTS 3,989,678  11/1976  Furukawa et al. ................. 260/78 L

*Primary Examiner*—Harold D. Anderson
*Attorney, Agent, or Firm*—Keil, Thompson & Shurtleff

[57] ABSTRACT

Copolyamides which are manufactured using (A) from 1 to 60 parts by weight of a cyclic lactam of 6 to 12 carbon atoms and/or an ω-aminocarboxylic acid of 6 to 20 carbon atoms and (B) from 40 to 99 parts by weight of the salt of at least two different dicarboxylic acids of the general formula HOOC-R-COOH where R is an aliphatic or cycloaliphatic radical of 4 to 46 carbon atoms with (a) cycloaliphatic and/or aliphatic diamines of 4 to 20 carbon atoms, which possess at least one secondary amino group and (b) optionally, up to 0.3 equivalent of primary α,ω-diamines of 2 to 20 carbon atoms, are excellent hot-melt adhesives.

2 Claims, No Drawings

COPOLYAMIDES FROM LACTAM AND DIAMINE SALTS OF TWO DIFFERENT DICARBOXYLIC ACIDS

The present invention relates to copolyamides which may in particular be used as hot-melt adhesives. The new copolyamides are synthesized using (A) from 1 to 60 percent by weight of a cyclic lactam of 6 to 12 carbon atoms and/or an ω-aminocarboxylic acid of 6 to 20 carbon atoms and (B) from 40 to 99 percent by weight of the salts of at least two different dicarboxylic acids of the general formula

HOOC—R—COOH where R is an aliphatic and/or cycloaliphatic radical of 4 to 46 carbon atoms and/or terephthalic acid and/or isophthalic acid and/or phenylenediacetic acid with (a) cycloaliphatic and/or aliphatic diamines of 4 to 20 carbon atoms, which possess at least one secondary amino group and (b) optionally, up to 0.3 equivalent of one or more primary α,ω-diamines of 2 to 20 carbon atoms, said equivalent being based on the carboxyl groups of the dicarboxylic acids.

The copolyamides of the invention, in the form obtained by melt condensation, exhibit excellent adhesion to a great variety of materials, eg. wood, including wood in the form of chipboard, leather, metals and especially thermoplastics, eg. polyesters, rigid PVC, flexible PVC, polystyrene, nylon, polyolefins, eg. polyethylene or polypropylene, and polyurethanes. The copolyamides of the invention may equally be used for gluing thermosetting resins, eg. melamine-formaldehyde or urea-formaldehyde resins, and unsaturated polyesters. They are suitable for this purpose regardless of whether the materials to be glued are in a compact form or in the form of films.

Examples of lactams which may be used as the component A for the manufacture of the copolyamides of the invention are caprolactam, caprylolactam, caprilactam, laurolactam and C-ethyl-ε-caprolactam. Examples of suitable aminocarboxylic acids are ω-aminocaproic acid and ω-aminoundecanoic acid. Caprolactam is the preferred component A. Examples of suitable α,ω-diamines to be used as component B b are polymethylenediamines of 2 to 20 carbon atoms, especially ethylenediamine, propylenediamine, butylenediamine, pentamethylenediamine, hexamethylenediamine, octamethylenediamine, nonamethylenediamine, decamethylenediamine, undecamethylenediamine, dodecamethylenediamine and nonadecanediamine, substituted linear diamines, eg. 2,2,4- and 2,4,4-trimethylhexamethylenediamine, cycloaliphatic diamines, eg. 4,4′-diaminodicyclohexylmethane, 3,3′-dimethyl-4,4′-diaminodicyclohexylmethane, 2,2-bis-(4-aminocyclohexyl)-propane and 1,4-di-(aminomethyl)-cyclohexane, ether-diamines, eg. 4,9-dioxadodecane-1,12-diamine and 6,6-dimethyl-4,8-dioxaundecane-1,11-diamine, and araliphatic diamines, eg. m-xylylenediamine and p-xylylenediamine, used individually or as combinations with one another.

Dicarboxylic acids to be used as constituents of component B are for example aliphatic α,ω-dicarboxylic acids of 6 to 15 carbon atoms and dimerized fatty acids of 16 to 48 carbon atoms, especially of 36 carbon atoms, used individually or as combinations with one another and/or terephthalic acid and/or isophthalic acid and/or phenylene diacetic acid.

Suitable secondary diamines to be used as component B a are aliphatic diamines of 4 to 20 carbon atoms, eg. bis-hexamethylenetriamine, and especially cycloaliphatic diamines of 4 to 20 carbon atoms, eg. piperazine, alkyl-substituted piperazines, 1-(2-aminoethyl)-piperazine, substituted piperidines, eg. 4-(2-aminoethyl)-piperidine and 1,3-bis-(4-piperidyl)-propane, -N,N-dimethyl-4,4′-diamino-dicyclohexylmethane, N,N′-dimethyl-3,3′-dimethyl-4,4′-diamino dicyclohexylmethane and N,N′-dimethyl2,2-bis-(4-aminocyclohexyl)-propane. Preferred components B are mixtures which in addition to the piperazine salt of adipic acid contain at least one salt from the group of the piperazine salt of dodecanedicarboxylic acid, the piperazine salt of $C_{36}$-dicarboxylic acid, the 2,2-bis-4-aminocyclohexylpropane salt of dedecanedicarboxylic acid and the bis-hexamethylenetriamine salt of dodecanedicarboxylic acid, the weight ratio of the piperazine salt to adipic acid to the other salts preferred as component B being preferably from 25 to 35 : from 35 to 45.

The amount of component A, especially of caprolactam, is in most cases from 5 to 60, and preferably from 20 to 60, percent by weight, based on the total amount of copolyamide, and accordingly the amount of component B is in most cases from 95 to 40, preferably from 80 to 40, percent by weight.

The copolyamides may be manufactured by conventional methods. The degree of condensation may be controlled in the usual manner by adding a chain regulator, eg. a monofunctional carboxylic acid, such as stearic acid or propionic acid, before carrying out the polycondensation. The polycondensation is in most cases carried out at from 180° to 300° C and preferably from 200° to 280° C.

Because of their good adhesion to wood, thermoplastics and thermosetting resins, the copolyamides of the invention are particularly suitable for edge banding in the furniture industry. For this purpose, the copolyamides must be easily processable and the glue bonds must withstand both low and high temperatures. To assess these two properties, test methods have been developed by a working party of Deutscher Fachverband Leime und Klebstoffe e.V., Dusseldorf. For testing the heat resistance, method WPS 68 has been published in the journal "Adhasion", Issue 1, Berliner Fachverlag GmbH, 1969, whilst method KPS 73, in the journal "Adhasion", Issue 6 (1973), 226 et seq. has been provided for testing the low temperature impact strength. The copolyamides of the invention were tested under the conditions of the above methods and it was found that the hot-melt adhesives, in the unmodified form, give excellent bond strengths both at low temperatures (below -20° C) and at above 100° C. However, the range of applicability of the copolyamides of the inventin extends far beyond the scope of WPS 68 and KPS 73.

The good adhesion mentioned in connection with edge banding also makes it possible to use the copolyamides of the invention for gluing compact materials of large surface area, eg. in site assembly work, in the construction of prefabricated dwellings, in mobile home construction and similar work grouped under the general term of "product assembly".

In addition to these possible applications, the copolyamides of the invention are also exceptionally suitable for gluing polyethylene films, eg. for sealing sacks, and for use in the manufacture of shoes.

In the Examples which follow, parts are by weight. The K values were determined by the method of H. Fikentscher, Cellulosechemie 13 (1932), 58, at 25° C.

EXAMPLE 1

(a) Manufacture of a copolyamide.

30 parts by weight of ε-caprolactam, 40 parts by weight of the piperazine salt of $C_{36}$-dicarboxylic acid, 30 parts by weight of the piperazine salt of adipic acid and 10 parts by weight of water are introduced into an autoclave. The precondensation is effected by heating the charge to 270° C, in the course of which the pressure rises to 20 atmospheres gauge. The reaction mixture is kept at this temperature for 1 hour and is then let down to normal pressure in the course of 2 hours. The reaction mixture is then post-condensed by heating for a further 2 hours at 270° C in a stream of nitrogen.

The product is dried and granulated by conventional methods. The dried granules have a K value (measured on an 0.5% strength solution in m-cresol) of 45.2.

(b) The heat resistance measured according to WSP 68 is 170° C, and the low-temperature impact strength, measured according to KPS 73, is -20° C.

EXAMPLE 2

(a) The copolyamide is manufactured from 30 percent by weight of the piperazine salt of adipic acid, 40 percent by weight of the piperazine salt of dodecanedicarboxylic acid and 30 percent by weight of caprolactam by the method described in Example 1. The copolyamide has a K value (measured on a 1% strength solution in concentrated sulfuric acid) of 44.7.

(b) The heat resistance according to WSP 68 is 130° C and the low-temperature impact strength according to KPS 73 is -20° C.

EXAMPLE 3

(a) The copolyamide is manufactured from 30 percent by weight of the piperazine salt of adipic acid, 40 percent by weight of the piperazine salt of dodecanedicarboxylic acid, 28 percent by weight of caprolactam, 1 percent by weight of the 2,2-bis-(4-aminocyclohexyl)-propane salt of dodecanedicarboxylic acid and 1 percent by weight of the bis-hexamethylenetriamine salt of dodecanedicarboxylic acid by the method described in Example 1. The copolyamide has a K value (measured on a 1% strength solution in concentrated sulfuric acid) of 48.5.

(b) The heat resistance according to WSP 68 is 110° C and the low-temperature impact strength according to KPS 73 is -20° C.

We claim:

1. A copolyamide hot-melt adhesive consisting essentially of the polymeric condensation product of
   A. from 20 to 60 percent by weight based on the weight of copolyamide, of caprolactam and
   B. from 80 to 40 percent by weight based on the weight of copolyamide, of a mixture of
      (a) the piperazine salt of adipic acid and
      (b) a salt chosen from the group consisting of the piperazine salt of dodecanedicarboxylic acid, the 2,2-bis-4-aminocyclohexyl-propane salt of dodecanedicarboxylic acid and the bis-hexamethylenetriamine salt of dodecanedicarboxylic acid, wherein the weight ratio of constituent (a) to constituents (b) in component B) is from 25 to 35 : 35 to 45.

2. Hot-melt adhesive based on copolyamide as set forth in claim 1.

* * * * *